US008971352B2

(12) United States Patent
Jost

(10) Patent No.: US 8,971,352 B2
(45) Date of Patent: Mar. 3, 2015

(54) HIGH ACCURACY 1588 TIMESTAMPING OVER HIGH SPEED MULTI LANE DISTRIBUTION PHYSICAL CODE SUBLAYERS

(71) Applicant: Thomas Jost, Camarillo, CA (US)

(72) Inventor: Thomas Jost, Camarillo, CA (US)

(*) Notice: Subject to any disclaimer, the term of this patent is extended or adjusted under 35 U.S.C. 154(b) by 0 days.

(21) Appl. No.: 14/041,626

(22) Filed: Sep. 30, 2013

(65) Prior Publication Data

US 2014/0092918 A1 Apr. 3, 2014

Related U.S. Application Data

(60) Provisional application No. 61/707,679, filed on Sep. 28, 2012.

(51) Int. Cl.
*H04L 12/50* (2006.01)
*H04J 3/00* (2006.01)
*H04J 3/06* (2006.01)
*H04L 12/26* (2006.01)

(52) U.S. Cl.
CPC ............. *H04J 3/0661* (2013.01); *H04L 43/106* (2013.01)
USPC ........... 370/465; 370/365; 370/367; 370/476; 370/509

(58) Field of Classification Search
None
See application file for complete search history.

(56) References Cited

U.S. PATENT DOCUMENTS

| 6,532,213 | B1* | 3/2003 | Chiussi et al. | 370/230.1 |
| 8,385,374 | B1* | 2/2013 | Wohlgemuth | 370/509 |
| 2002/0018444 | A1* | 2/2002 | Cremin et al. | 370/235 |
| 2003/0043851 | A1* | 3/2003 | Wu et al. | 370/476 |
| 2003/0055998 | A1* | 3/2003 | Saha et al. | 709/233 |
| 2004/0100958 | A1 | 5/2004 | Peng | |
| 2010/0049964 | A1 | 2/2010 | Kondapalli et al. | |
| 2010/0232785 | A1 | 9/2010 | Gazier et al. | |
| 2012/0066531 | A1 | 3/2012 | Shafai et al. | |
| 2012/0082156 | A1 | 4/2012 | Swartzentruber et al. | |

OTHER PUBLICATIONS

International Search Report on related PCT Application No. PCT/US2013/062716 from International Searching Authority (KIPO) dated Jan. 13, 2014.
Written Opinion on related PCT Application No. PCT/US2013/062716 from International Searching Authority (KIPO) dated Jan. 13, 2014.

* cited by examiner

*Primary Examiner* — Yemane Mesfin
*Assistant Examiner* — Peter Chen
(74) *Attorney, Agent, or Firm* — Klein, O'Neill & Singh, LLP

(57) ABSTRACT

A physical layer device provides for synchronization of clocks in a communication network. A place holder for an alignment marker is inserted into a frame to be transmitted. Once the placeholder alignment marker is inserted into the frame, no additional data is added to the frame. Transmission of the frame including the placeholder alignment marker may also be delayed to allow data processing in subsequent blocks within a transmit block to complete prior to further processing of the frame including the placeholder alignment marker (e.g., timestamping, MACSec, etc.) to improve timing accuracy with a multi lane distribution environment.

9 Claims, 8 Drawing Sheets

HIGH ACCURACY 1588 TIMESTAMPING OVER HIGH SPEED MULTI LANE DISTRIBUTION PHYSICAL CODE SUBLAYERS

CROSS REFERENCE TO RELATED APPLICATIONS

This application claims the benefit of the filing of U.S. Provisional Patent Application No. 61/707,679, filed on Sep. 28, 2012, the disclosure of which is incorporated by reference herein.

BACKGROUND OF THE INVENTION

The present invention is generally directed to synchronization of clocks, and more particularly to synchronization of clocks in a packet-switched communication network.

Clock synchronization is important in many automated electronic systems. Many automated electronic systems use Ethernet as a communication medium because of its ease of installation and low cost. In such systems, it may be advantageous for devices in the network to have a common base time. The common base time may be used, for example, to trigger coordinated measurement instances in a network of sensors, to coordinate actions of controllers in an industrial system, or to synchronize clocks of mobile/cellular radio base stations. In addition to sensors, controllers, and radio base stations, the system may include computers and communication devices, such as routers.

The Precision Time Protocol (PTP) is designed to synchronize clocks across packet based networks. PTP allows for synchronization of distributed clocks to sub-microsecond accuracy. PTP relies on a measurement of the communication path delay between a source and a receiver. Preferably, the precise moments of transmitting and receiving a message are measured for a message transaction. Messages including the current time information may then be adjusted to account for the determined path delay. The path delay measurement may be determined based on the timing of a sync message and a delay request. The average path delay of the two messages gives the one way delay, if for example the path delay is symmetric in both directions. Unfortunately, the path delay may not be symmetric in both directions, and variable latencies within any particular path may also result in variability in path delays.

BRIEF SUMMARY OF THE INVENTION

One aspect of the invention provides a method useful in time stamping packets in a multilane distribution environment, comprising: adapting a data stream from a first data rate to a second data rate; after adaptation of the data stream, inserting placeholders in the data stream for lane alignment markers; after insertion of the placeholders, setting a timestamp field of a precision time protocol frame in the data stream so as to indicate an expected transmission time of the frame; after setting the timestamp field, removing the placeholders from the data stream and inserting lane alignment markers into the data stream; and providing the data stream in separate lanes for transmission.

Another aspect of the invention provides a physical layer communication device, comprising: a rate adaptation block configured to adjust a data flow rate to account for differences in rates between a rate of a higher level device and a rate of transmission; a placeholder insertion block configured to insert placeholders for alignment markers into data processed by the rate adaptation block; a timestamp engine configured to write a timestamp value into data processed by the placeholder insertion block; and circuitry configured to distribute the data processed by the timestamp engine into a plurality of lanes, to insert the alignment markers, and to remove the placeholders for the alignment markers.

Another aspect of the invention provides a physical layer communication device, comprising: a rate adaptation block to receive and buffer frames to be transmitted; a timestamp engine, coupled to the rate adaptation block, to timestamp some of the frames by adding to the some of the frames an indication of a predicted time that the frame is transmitted; and a placeholder insertion block, coupled to the timestamp engine, to insert alignment marker placeholders into the frames, the placeholder insertion block additionally providing to the timestamp engine an indication of a level of fill of buffers in the placeholder insertion block; wherein the timestamp engine delays timestamping of the some of the frames when the indication of the level of fill of the buffers in the placeholder insertion block indicates that the buffers are not empty.

Another aspect of the invention provides a method of performing timestamp related processing for frames subject to MACSec processing, comprising: inserting idle symbols until buffers utilized for MACSec processing are empty; inserting a timestamp into a data frame once the buffers utilized for MACSec processing are empty; performing MACSec processing on the timestamped data frame; and inserting a placeholder for an alignment marker at a predetermined location within the MACSec processed data frame.

These and other aspects of the invention are more fully comprehended upon review of this disclosure.

DETAILED DESCRIPTION

For an Ethernet transmission device, a Physical Coding Sublayer (PCS) receives information from a Media Access Controller (MAC) or Reconciliation Sublayer (RS) of a data link layer, with the PCS providing the information to a physical medium attachment/physical medium dependent (PMA/

PMD) Sublayer for transmission over a medium. The PCS performs various functions, for example 64 b/66 b encoding and scrambling, with the PCS also including a multilane distribution (MLD) Sublayer, at least for particular Ethernet transmission devices. In some embodiments alignment markers are used to identify virtual lanes in a multilane distribution environment. As the PCS may operate at slightly different data speeds than a data link layer, rate adjustment or adaptation may be performed, generally through insertion or deletion of idle symbols.

In some embodiments of the invention the PCS performs time stamp functions for a precision packet timing protocol (PTP), for example 1588v2, with the time stamp functions performed, for transmission, after performance of rate adaptation. In some embodiments of the invention, time stamp functions are also performed after alignment marker placeholders have been inserted into the data stream. In some embodiments a physical layer device performs rate adaptation for packets, inserts frame alignment marker placeholder symbols into packets, performs a time stamping operation on at least one packet, encodes the packets, scrambles the packets, distributes the packets into multiple lanes, and inserts a frame alignment marker into at least one packet and deletes a corresponding frame alignment marker placeholder. In some embodiments the encoding of the packets, the scrambling of the packets and distribution of the packet in lanes, which are virtual lanes in some embodiments, is performed by a PCS of the PHY. In some embodiments the PHY includes a PMA/PMD and a transmitter. In some embodiments the rate adaptation is performed using a FIFO, with reading of the FIFO performed with a clock frequency locked to a clock of a serializer of the transmitter.

Figure 1:
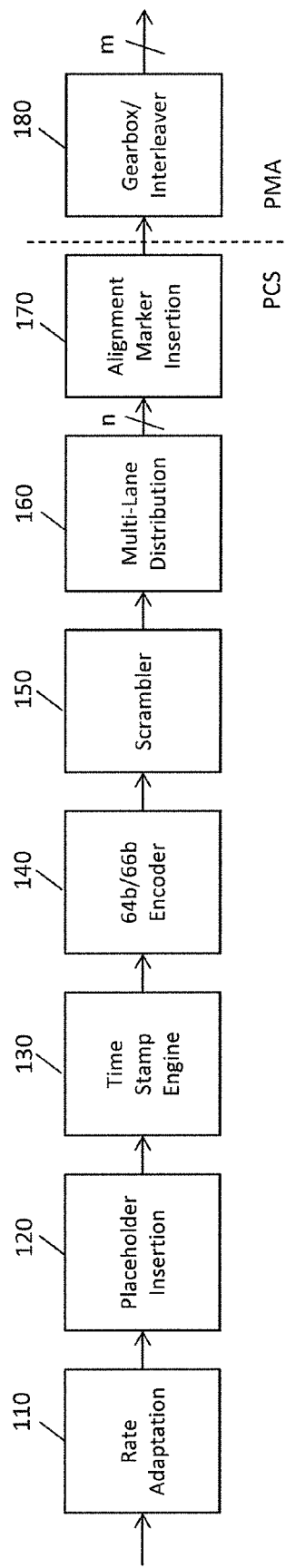
FIG. 1 is a block diagram of portions of a physical layer communication device in accordance with aspects of the present invention.

FIG. 1 is a block diagram illustrating portions of a communication device, in some embodiments a physical layer communication device (PHY), in accordance with aspects of the present invention. Referring to FIG. 1, the PHY includes a rate adaptation block 110 which receives frames via an interface. The rate adaptation block 110 adjusts the rate of data flow. The rate adaptation block may adjust the rate of data flow, for example, by inserting or removing idle symbols to delay or expedite data flow, and/or to account for differences in data rates due to, for example, symbols added during processing of data.

The rate adaptation block provides data frames to a placeholder insertion block 120. The placeholder insertion block inserts a placeholder for an alignment marker into the data frame to produce a modified frame. The alignment marker generally will be inserted prior to data transmission, via an alignment marker insertion block 170 in the embodiment of FIG. 1, to allow for realignment of data by a receiving device. The placeholder may be 64 bits in length and may be inserted into a predetermined area of a data frame. In some embodiments, the placeholder is inserted every 16 k blocks, for example every 16 k 66 bit blocks when 64 B/66 B encoding is used. The placeholder insertion block may also provide an indication of a timing at which the placeholder insertion block transmits the data frame including the placeholder alignment marker. For example, each modified data frame may be supplied to the timestamp engine on the rising edge of the lane 0 signal. In some embodiments, the data may be supplied in parallel for reasons of efficiency.

The placeholder insertion block supplies the modified frame to timestamp engine 130. The timestamp engine may, for each frame received, determine whether the frame is one for which timestamp processing will be performed. The timestamp engine 130 calculates and produces a timestamp value for a received frame for which timestamp processing is to be performed. In some embodiments, the timestamp engine uses a local time value obtained from a local clock to calculate the timestamp. In many embodiments, the local time value is adjusted to account for expected delays in the transmission chain between the point at which the timestamp is inserted and the point at which the frame is transmitted. More particularly, in many embodiments the local time value is adjusted to the time when a specific part of the frame is expected to be transmitted, for example, the end of an Ethernet start of frame delimiter (SOF) is expected to be transmitted. Accordingly, in some embodiments, the local time value used by the timestamp engine may be a value from the local clock plus a delay value that compensates for delays between the input to the communication device, for example when the rate adaptation block 110 receives the data, and the time at which the timestamp engine 130 receives a value from the local clock. In other embodiments, the local time value may be sampled and supplied to the timestamp engine with the frame. In some embodiments, delay values may be calculated using, for example, a measured loopback delay.

The timestamp engine 130 may write the new timestamp value to a location in the frame. The location written may vary depending on the format of the frame. In many embodiments, the location written is the same location from which the received timestamp value was read. The location may be the location of an IEEE 1588 frame's correction field. Some embodiments include frame classifications where the new timestamp value is written into a location in a preamble of the frame, a reserved location in the frame, or appended to the end of the frame.

The timestamped frame is supplied to an encoder 140. The encoder performs an encoding process to encode the received data frame. For example, the encoder may perform a 64 b/66 b encoding process to convert a 64 bit frame into a 66 bit frame, generally having a two bit header and a 64 bit payload. In some embodiments, the encoding process may be 10 GBASE-R transmission encoding. The encoder may encode 8 data octets and/or control codes into a block. The encoder may include a two bit sync header in each of the received frames. The two bit sync header may be used to distinguish control frames from data frames, for example. In some embodiments, the frame transmission may be synchronized based on the two bit sync headers.

The encoder provides data frames to scrambler 150. The scrambler 150 may, for example, include a self synchronous scrambler and scrambles the payload portion of the frame to produce a scrambled frame.

The scrambler supplies the scrambled frames to multi-lane distribution (MLD) block 160. The MLD block includes a plurality (n) of lanes for distributing the scrambled frames. The MLD block distributes the frames to a particular lane of the MLD. Alignment marker inserter 170, which in some embodiments is part of the MLD block, periodically inserts an alignment marker (e.g., every 16 k*66 bits) to each of the lanes of the MLD and removes the placeholder alignment marker. The alignment markers may be unique for each lane of the MLD and thus, may be used to enable a receiver to reassemble the frames into a single data stream.

The scrambled frames distributed over the n lanes of the MLD are supplied to gearbox/interleaver block 180. The gearbox/interleaver block 180 interleaves the (n) MLD lanes into a plurality (m) of Media Dependent Interface (MDI) lanes.

In some embodiments, the functions of the encoder block, scrambler block, MLD block and alignment marker insertion block may be performed via a PCS or by separate devices.

Figure 2:
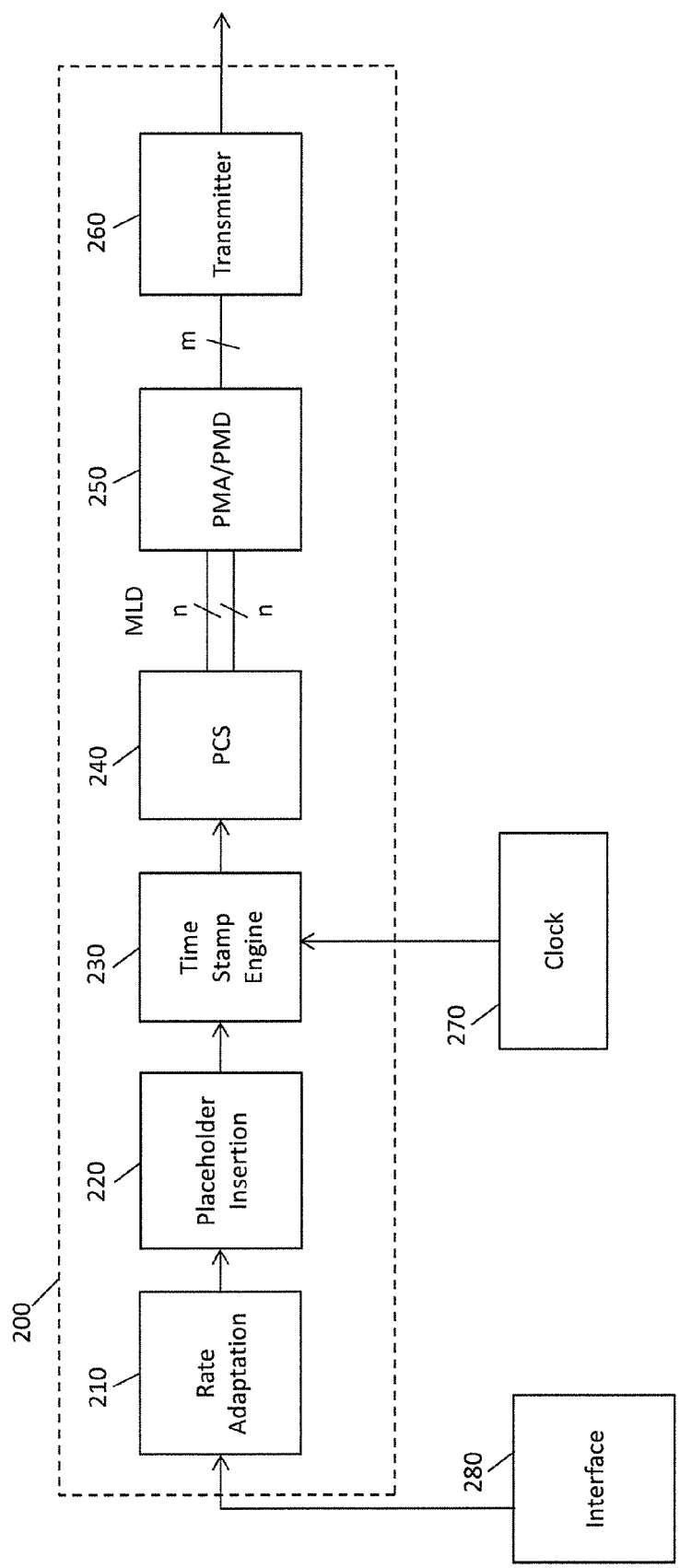
FIG. 2 is a block diagram illustrating a physical layer communication device in accordance with aspects of the present invention.

FIG. 2 is a block diagram of a physical layer communication device (PHY) in accordance with aspects of the present invention. The PHY of FIG. 2 is usually part of an Ethernet system, and generally an Ethernet system that includes multi-lane distribution (MLD) features. Referring to FIG. 2, the PHY includes a transmit block 200 to transmit an output signal to a communication network. The PHY further includes an interface block 260 for coupling to higher-level devices, although in some embodiments various other processing and/or formatting blocks may also be included in the signal path between the transmit block and the interface block. A local clock 270 may be included in the PHY to provide a time base for the PHY and supply local time values to the transmit block. The blocks of the PHY are generally implemented with electronic circuitry. For example, in one embodiment the PHY is provided in one CMOS integrated circuit, chip, or portion thereof. Software programming may be used to control operation of some circuitry in the PHY. In one embodiment, a programmable processor is used to configure the circuitry of the PHY and to handle exception conditions.

The interface block 280 provides an interface to a higher-level component, such as a media access controller (MAC). The higher-level component may perform frame processing, such as determining destinations for the frames, for example. The interface to a higher-level component may be, in one embodiment, a gigabit media-independent interface (GMII). Frames received via the interface are supplied to the transmit block 200.

The transmit block 200 generally receives frames for transmission, buffers the frames, performs timestamp processing for appropriate frames and transmits the frames. In various embodiments the received frames may be in virtual lanes, with a PCS block placing data of the received frames into multiple physical lanes. In some embodiments, the transmit block may further perform media access control (MAC) security (MACSec) processing for appropriate frames.

Referring to FIG. 2, the transmit block includes a rate adaptation block 210, an alignment marker placeholder block 220, a timestamp engine 230, physical coding sublayer (PCS) 240, physical medium dependent layer (PMD)/physical medium attachment layer (PMA) 250 and a transmitter 260. In various embodiments the transmit block may receive frame in virtual lanes, and distribute data of the lanes from a PCS to a PMA/PMD using multi lane distribution.

The rate adaptation block 210 receives frames to be transmitted from the PHY and buffers the frames. A frame may also be termed a packet depending, in part, on the format standard. The rate adaptation block may be frequency locked to a local clock. In some embodiments, the rate adaptation block is frequency locked to a SerDes clock of the transmit block. The rate adaptation block is configured to adjust the data flow rate to account for differences in rates between a rate of a higher level device and a rate of transmission from the transmit block.

In some embodiments, the rate adaptation block may be configured to provide for a different flow rate for data at different portions of the data flow path. For example, the data flow rate may be adjusted to be slightly faster to circuit for encoders, etc. which in one example is a 64 B/66 B encoder which receives 64 bits of data and outputs 66 bits.

In some embodiments, the rate adaptation block may delay transmission of frames in response to an indication that a PAUSE frame requesting a pause in transmission of frames has been received. In some embodiments, control frames are not so delayed. In various embodiments, the rate adaption block receives an indication from a receive block and/or a higher level by way of the interface block 280. The interface block 280 provides an interface to a higher-level component, such as a media access controller (MAC).

The rate adaptation block may also be used to compensate for rate differences due to lane alignment marker insertion. A lane alignment marker (also referred to as an alignment marker) may be periodically inserted in data frames of a data stream which is deserialized for more efficient data transfer. The alignment marker is a unique identifier for a particular lane in a multi lane distribution environment. The alignment markers enable a receiver of the deserialized data to reconstruct the data into a single data stream. The rate adaptation block may compensate for the alignment marker insertion by deleting idle control characters.

In some embodiments, the rate adaptation block may be configured to provide for a different flow rate for data at different portions of the data flow path. For example, the data flow rate may be adjusted to be slightly faster to account for encoders, etc. which in one example is a 64 B/66 B encoder which receives 64 bits of data and outputs 66 bits.

In some embodiments, timestamp processing or MACSec processing may delay transmission of frames, in such cases, the rate adaptation block may signal the higher-level device to pause or slow the supplying of frames to the PHY.

The buffered frames are received by a placeholder insertion block 220. The placeholder insertion block inserts a placeholder for an alignment marker which is typically inserted later via the PCS prior to data transmission. The placeholder marker may be inserted periodically (e.g., every 16 k blocks), and in some embodiments, may be 64 bits wide.

The frames including the placeholder markers are then supplied to the timestamp engine 130. The timestamp engine may for each frame received determine whether the frame is one for which timestamp processing will be performed. In some embodiments, the timestamp engine may make the timestamp determination using addresses and tags in the frame. The timestamp processing generally utilizes the time, as indicated by the local clock 270, that the frame will be transmitted. For various frames, the time of transmission may be inserted in the frame, added or subtracted to a value in the frame, or supplied to a higher-level device.

The local clock 270 generally provides time values that are synchronized to another clock in the communication network. In one embodiment, the local clock is a master clock for the communication network and is synchronized to a high accuracy clock such as the U.S. Naval Observatory. In some embodiments, the local clock 270 in the PHY receives an input clock signal and a time value that are supplied by a time module. The time module may in various embodiments determine the time of day through its own clock, a signal received by the PHY, or a combination thereof.

In some embodiments, the timestamp engine may predict the time of transmission by adjusting a time value from the local clock based on expected delays related to subsequent data processing in the transmit block prior to transmission. Accordingly, the timestamp engine may provide an indication to rate adaptation block to delay supplying a frame. In some embodiments, the timestamp engine may also account for that delay in determining a timestamp value, so that the added bits, and/or other delays, do not cause a delay in transmission that would reduce accuracy of the predicted time of transmission.

The timestamp engine 230 calculates and produces a new timestamp value for a data frame. In some embodiments, the timestamp engine uses the local time value obtained from the local clock 270 to calculate a new timestamp. In many embodiments, the local time value desired is the time when a specific part of the frame (for example, the end of an Ethernet start of frame delimiter (SOF)) is transmitted from the transmitter 260. Accordingly, in some embodiments, the local time value used by the timestamp engine may be a value from the local clock 270 plus a delay value that compensates for delays between the time at which the timestamp engine 230 writes a timestamp value and the time at which the frame is transmitted by the transmitter.

The timestamp engine 230 may write the new timestamp value to a location in the frame. The location written may vary depending on the format of the frame. In many embodiments, the location written is a timestamp field of an IEEE 1588 frame. The location may, in some embodiments, be the location of an IEEE 1588 frame's correction field, although in such embodiments the value written may be, for example, a difference between a timestamp value in the timestamp field and an expected time of transmission by the transmitter. Some embodiments include frame classifications where the new timestamp value is written into a location in a preamble of the frame, a reserved location in the frame, or appended to the end of the frame.

The timestamped frame is supplied to physical coding sublayer (PCS) 240. The PCS processes the received timestamped frame including the placeholder alignment markers. The PCS encodes and scrambles the data. In some embodiments, the data may be encoded using 64 b/66 B encoding to produce a 66 bit data block. In this case, the two most significant bits may serve as a sync header and be used to indicate a frame type. For example 10 may be used to indicate that the frame includes a control block. When the two bit sync header is 01, the frame includes a data block. In some embodiments, the data may be scrambled using a self synchronous scrambler.

The PCS distributes the frames to the PMA/PMD via a multi lane distribution (MLD) environment. The PCS distributes the data across a plurality (n) of PCS virtual lanes, 66 bit blocks at a time, generally in a round robin fashion. As the bit blocks are distributed to the lanes of the MLD, the PCS inserts an alignment marker periodically (e.g., every 16 k blocks) and removes a corresponding placeholder marker. The alignment marker is a unique identifier designating a particular lane in a MLD. As such, the alignment markers will enable a receiver to realign the data frames and reassemble a single data stream.

The PCS supplies the frames to the PMA/PMD via the MLD. The PMA/PMD performs bit level multiplexing to map (n) virtual lanes to a plurality (m) of PMA/PMD electrical lanes and provides the multiplexed frames including the alignment markers to the transmitter 260 for output to the communication network.

The transmitter 260 may be coupled to a communication link, for example, a fiber optic cable or other communication medium in the communication network, to transmit the output signal. The transmitter 260 processes the frames to produce the output signal. In many embodiments, the output signal is transmitted according to a standard format, for example, a standard for Ethernet.

Figure 3A:
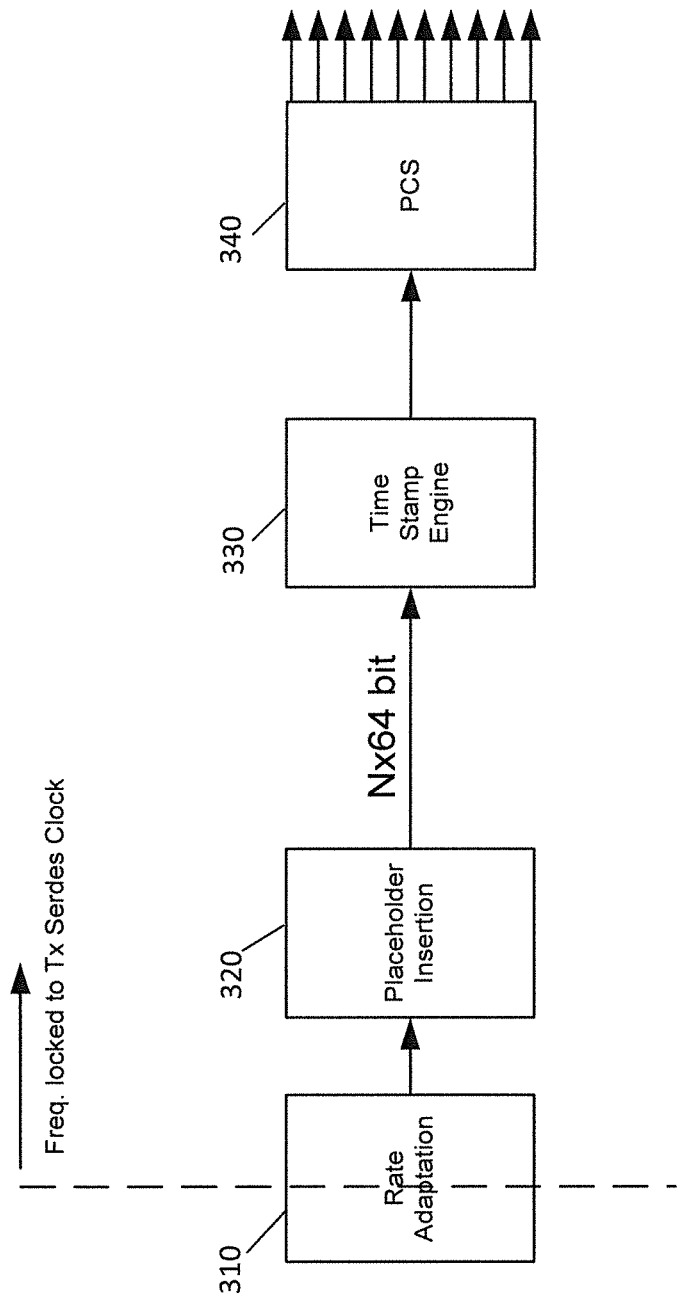
FIG. 3a is a block diagram of a physical layer communication device in accordance with aspects of the present invention.

FIG. 3a is an expanded block diagram illustrating a portion of physical layer communication device in accordance with aspects of the present invention. Referring to FIG. 3a, the PHY includes a rate adaptation block 310, a placeholder insertion block 320, a timestamping block 330 and a physical coding sublayer (PCS) 340. The rate adaption block may be configured with a FIFO to enable storage and processing of the incoming data frames. The rate adaptation block receives the incoming data and inserts or removes idle symbols depending on the fill level of the FIFO to adjust the data flow rate. In doing so, the rate adaptation block synchronizes a local clock to be frequency locked to a master clock. In some embodiments, the local clock signal may be frequency locked to a serializer/deserializer (SerDes) clock of the transmitter block (not shown).

The placeholder insertion block inserts a placeholder for an alignment marker to produce a modified data frame. Notably, in the embodiment of FIG. 3a, the placeholders are inserted before data frames are timestamped. Insertion of placeholders for alignment markers reduces variable latency in the transmission chain after writing of timestamp values as later insertion of alignment markers may be done in conjunction with removal from the datastream of similar sized placeholders.

The modified data frames may be provided to the timestamp engine at a timing based on receipt of a start of frame (SOF) delimiter. The placeholder alignment marker insertion block may supply the data signal to the timestamp engine according to a start of frame (SOF) delimiter of a data frame. In addition, the placeholder alignment marker insertion block may provide an indication of when it transmits data using lane 0 as an additional timing signal.

The timestamping engine synchronizes the data signal according to a lane 0 indicator. The timestamp engine writes a timestamp into a predetermined area of the modified data frame. The timestamped frame is then supplied to the PCS. The PCS then distributes the timestamped data frames to a PMA/PMD via MLD. The PCS distributes the data across a plurality (n) of PCS virtual lanes, 66 bit blocks at a time in round robin fashion. As the bit blocks are distributed to the lanes of the MLD, the PCS locates the alignment marker placeholders and replaces the placeholders with alignment markers. In some embodiments, the placeholders are not at an appropriate location for an ultimate alignment marker. In such a case, the PCS inserts alignment markers at the appropriate location and removes the placeholder. The alignment markers will enable a receiver to realign the virtual lanes and reassemble a single data stream.

Figure 3B:
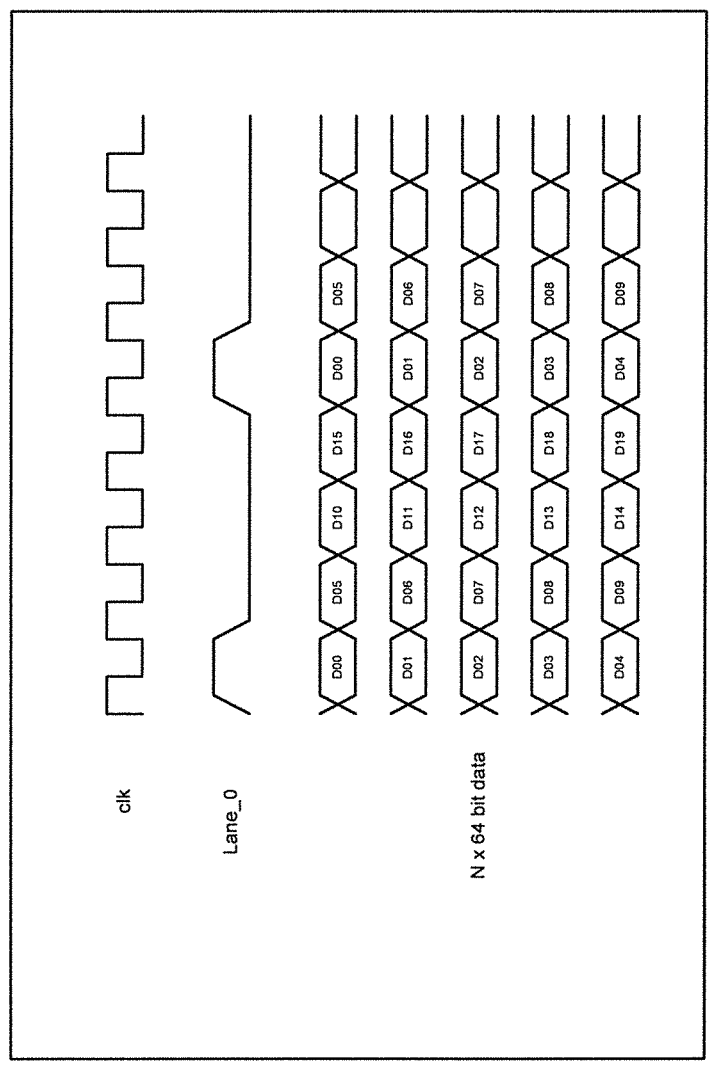
FIG. 3b is a timing diagram illustrating a timing of data flow in a PHY in accordance with aspects of the present invention.

FIG. 3b is a timing diagram illustrating a timing of data flow in a PHY in accordance with aspects of the present invention. Referring to FIG. 3b, a lane 0 signal is generated and supplied by the placeholder insertion block to the timestamp engine. The lane 0 signal may be used for synchronization purposes and provides an indication of timings at which the placeholder insertion block transmits a data frame (N×64 bits) to the timestamp engine for timestamp processing. The lane 0 indicator may further be used to ensure that as data is supplied to the PCS by the timestamp engine, the 64 bit blocks with lane 0 indicator are mapped to lanes 0 of the MLD.

Figure 4A:
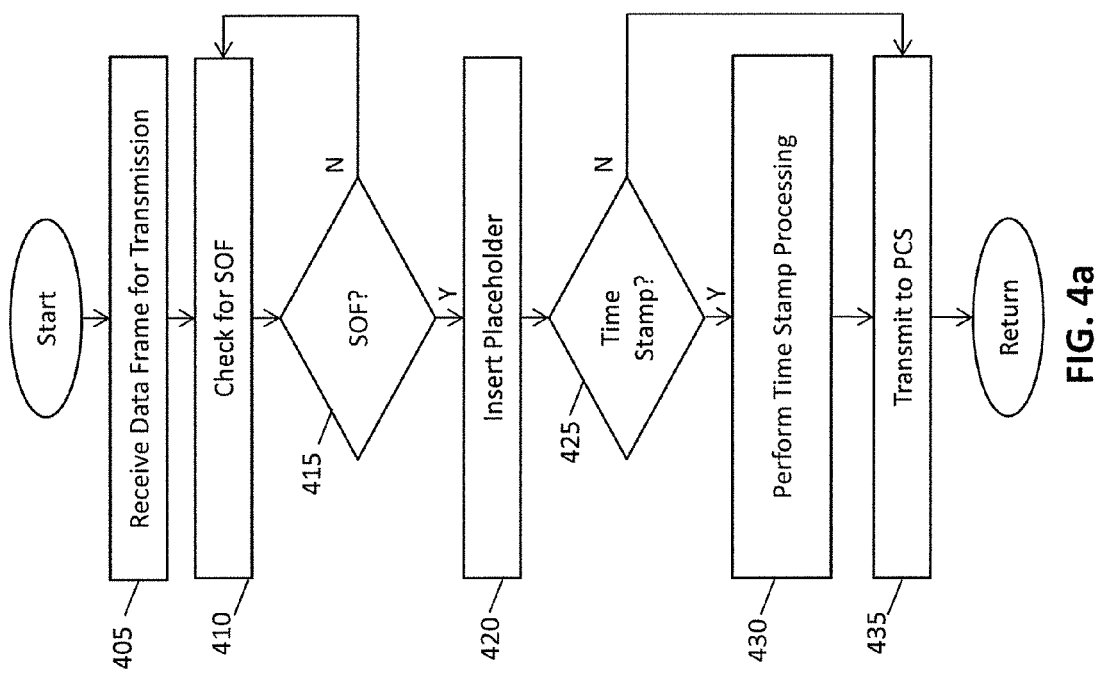
FIG. 4a is a flow diagram illustrating a process for providing high accuracy timing information in a communication device in accordance with aspects of the present invention.

FIG. 4a is a flow diagram illustrating a process for providing high accuracy timing information in a communication device in accordance with aspects of the present invention. At block 405, the process receives a data frame for transmission. The rate of transmission of the data frames may be adjusted such that the data frame transmission may be frequency synchronized with a local clock signal such as a transmitter SerDes clock.

At block 410, the process checks for a start of frame (SOF). At block 415, the process determines whether a SOF has been received. In some embodiments, the SOF may be deemed to have been received when the end of an SOF delimiter has been detected. If the SOF has not been received, the process returns to block 410 and continues to check for a SOF. On the other hand, if a SOF has been received, at block 420, the process inserts a placeholder for an alignment marker is in the data frame. The placeholder may be placed at a predetermined location of the data frame to produce a modified data frame.

At block 425, the process determines whether a timestamp is to be included in the data frame. If not, at block 435, the modified data frame is transmitted to the PCS. The PCS may perform further processing of the modified data frame such as distributing blocks of the modified data frame in a round robin fashion into a plurality of lanes. The PCS may also insert alignment markers such that a receiver will be able to recover the data in a single data stream upon receipt. The PCS may also be used to remove the placeholder alignment markers during the process of inserting the actual alignment markers.

If a timestamp is to be included in the data frame, at block 430, the process performs timestamp processing on the modified data frame. The timestamp engine determines a new timestamp for the data frame using a local clock signal. At block 435, the timestamped data frame is transmitted to the PCS. The PCS may then process and distribute the timestamped data frames. The process returns.

Figure 4B:
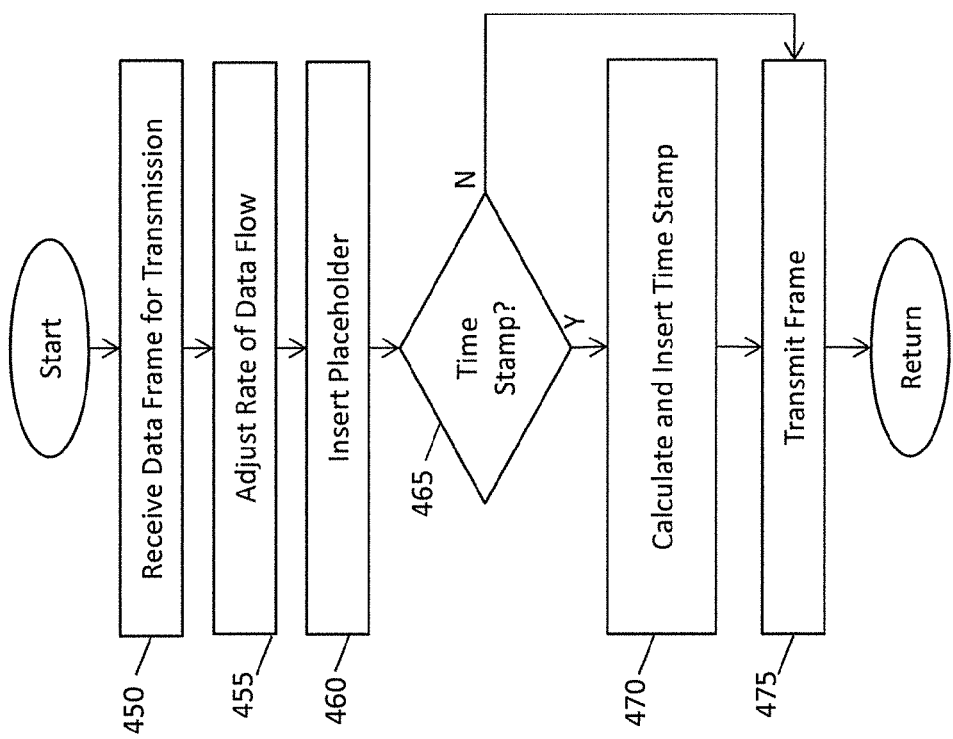
FIG. 4b is a flow diagram illustrating a process for providing high accuracy timing information in a communication device in accordance with aspects of the present invention.

FIG. 4b is a flow diagram illustrating a process for providing high accuracy timing information in a communication device in accordance with aspects of the present invention. At block 450, the process receives a data frame for transmission.

At block 455, the process adjusts the rate of data flow. In some embodiments, the data flow may be adjusted by inserting idle symbols to delay the flow of data. In some embodiments, the data flow may be delayed based on a fill level of buffers within the transmit block.

At block 460, the process inserts an alignment marker placeholder into a data frame. The placeholder may be inserted periodically (e.g., every 16 k blocks). The placeholder may be placed at a predetermined location of the data frame to produce a modified data frame. The alignment marker placeholder is generally equal in length to an actual alignment marker. In some embodiments, the placeholder marker is 64 bits. In some embodiments, following insertion of the alignment marker placeholder, no additional data bits will be inserted or removed from the data frame.

A transmit timing signal may be generated and supplied to subsequent blocks within the transmit block to indicate a timing for data transmission from the transmit block.

At block 465, the process determines whether a timestamp is to be included in the data frame. If a timestamp is not to be included in the data frame, the process continues and at block 475, the process transmits the data frame at a timing according to the transmit timing signal.

If, on the other hand, a timestamp is to be included in the data frame, at block 470 the process calculates and inserts a timestamp into the data frame. The timestamp may be calculated using the local clock.

At block 475, the data frame is transmitted at a timing according to the transmit timing signal.

Figure 5:
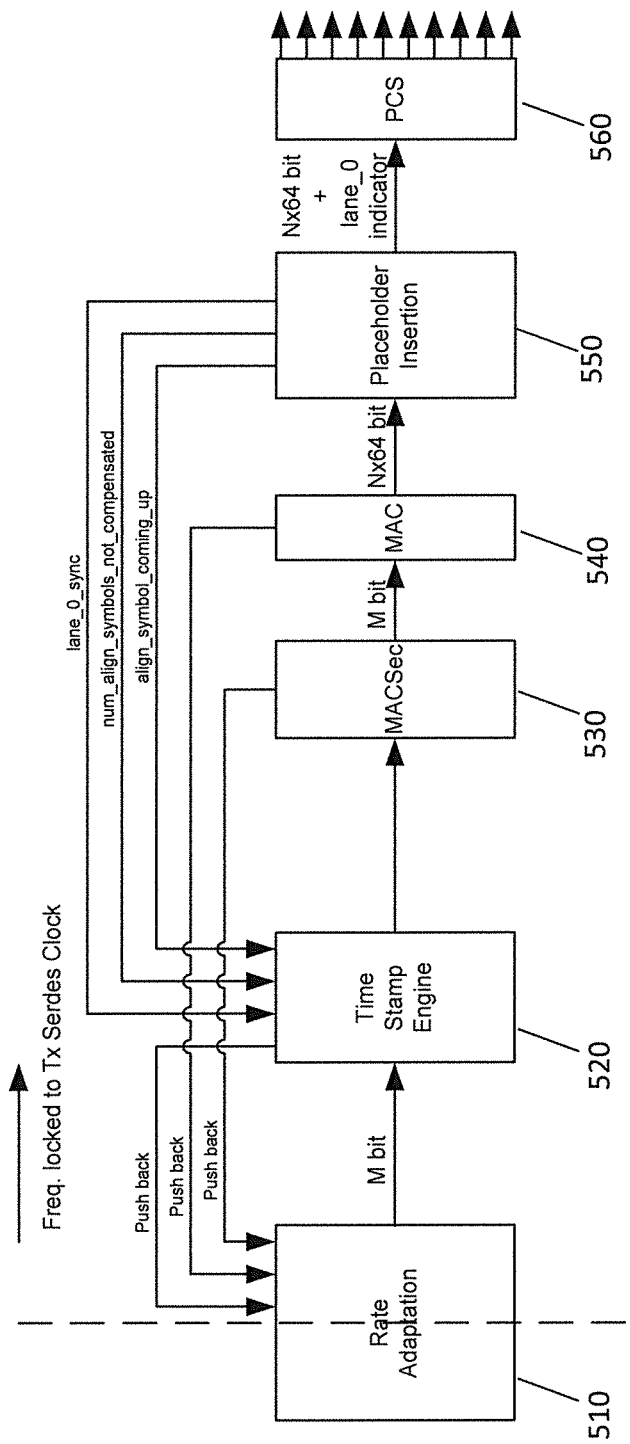
FIG. 5 is a block diagram of a physical layer communication device in accordance with aspects of the present invention.

FIG. 5 is a block diagram illustrating a physical layer communication device in accordance with aspects of the present invention. Referring to FIG. 5, the PHY includes additional data security protection. The PHY is includes a media access control security (MACSec) block 530. The MACSec block includes an encryption engine which encrypts the timestamped frames. In some embodiments, the timestamped frames are encrypted in accordance with the IEEE 802.1 MAC Security protocol.

The PHY also includes a data buffer and rate adaptation block to receive an incoming data signal. The rate adaptation block receives and buffers data frames to be transmitted from the PHY. The rate adaptation block may buffer frames to account for differences in rates between a rate of a higher level device and a rate of transmission from the transmit block, for example. Further, the reception and transmission may occur at the same nominal bit rate, but the MACSec block 530 may add additional bits to a data frame to slow frame transmission. Additionally, the timestamp engine 520 may delay transmission of frames. The rate adaptation block may receive indications from the MACSec block, the timestamp engine and/or placeholder insertion block 550 that data transmission is delayed and/or that data transmission may proceed. The rate adaptation block may also signal higher-level devices to pause or slow supplying frames to the PHY. In some embodiments, the rate adaptation block delays data transmission in response to an indication that a PAUSE frame requesting a pause in data transmission has been received. The rate adaptation block may receive such indications from a receiver (not shown) in the PHY or from a higher-level via the interface. In some of these embodiments, control frames are not so delayed.

The rate adaptation block supplies the buffered frames to timestamp engine 520. The timestamp engine adds in some frames, an indication of a time that the frame is transmitted from the PHY. The times stamp block determines for each frame received whether a timestamp is appropriate and thus whether timestamp processing will be performed. In some embodiments, the timestamp engine may use the time the time that a frame will be transmitted, as indicated by the local clock, to determine a timestamp for that frame. In some frames, a time of transmission may be inserted into a designated area of the frame. The time of transmission may also be added to or subtracted from a value included in the frame and/or supplied to a higher-level device.

The timestamp engine may also be used to predict a time of transmission by adjusting a time value from the local clock based on an expected delay related to or in the MACSec block or the alignment marker placeholder block 550. In some embodiments, the timestamp engine will receive an indication of the fill level of buffers included in the placeholder insertion block. In these embodiments, when the timestamp engine receives an indication that the buffer in the placeholder insertion block is not empty, the timestamp engine delays timestamping until the buffers in the placeholder insertion block run empty.

In some embodiments, the timestamp engine may adjust a time value by a fixed amount for frames subjected to MACSec processing. The delay of a timestamped frame in the MACSec block may depend on what processing the MACSec block performs on a preceding frame. For example, the MACSec block may add bits to the preceding frame, and in some embodiments perform operations on information of the frame such as encryption processing, that delays the frame and possibly delays processing of subsequent data frames. As such, the timestamp engine may delay supplying an already timestamped frame to the MACSec block, and account for that delay in determining a timestamp value, such that the added bits, and/or other delays, do not cause a delay in transmission that would reduce accuracy of a predicted time of transmission. In some embodiments, all timestamped frames are delayed without regard to whether the preceding frame in the transit chain is modified or to be modified by MACSec processing. On the other hand, non-time-stamped frames are not so delayed. In some embodiments, the delay of frames subject to timestamping may be performed after determining that a frame is to be timestamped, but prior to timestamping the frame, such that delay of a frame by the timestamp engine need not be accounted for in determining timestamp values. The timestamp engine may also signal the rate adaptation block when a frame is delayed.

The timestamp engine supplies the timestamped data frame to MACSec block 530. In some embodiments, the timestamped frame may be supplied at a timing according to the receipt of a SOF delimiter. The MACSec block performs, for some of the frames, security related processing, such as encryption. The MACSec block, for each frame received from the timestamp engine, determines, for example, based on addresses and tags in the frame, whether the frame is one for which MACSec processing will be performed. In some embodiments, for frames subject to MACSec processing, the MACSec block may add a security tag to a frame and utilizes a cipher to generate and add an integrity check value (ICV) to the frame for use at a receiver to verify that the frame has not been modified. The MACSec processing may also encrypt payload data in the frame. The addition of the security tag and ICV increases the size of the MACSec processed frame so that a following frame may be delayed by the time used to transmit the additional bits, and possibly also delayed due to time required for, for example, encryption processing. The delay incurred may vary with the gap between frames provided to the MACSec processing block, with the delay decreasing as the gap between the frames increases. For example, if the succeeding frame were separated from the MACSec processed frame by a minimum allowed gap, the delay would be large, and if the succeeding frame were separated from the MACSec processed frame by at least the minimum allowed gap plus the number of bits added by the MACSec processing, no additional delay would be incurred.

The MACSec block may further provide an indication of the fill state of the buffers therein to the rate adaptation block for adjustment of the data flow rate.

The MACSec block then provides the data frames to MAC block 540 which provides the data frames to the placeholder insertion block 550. The placeholder insertion block 550 inserts an alignment marker placeholder into a predetermined area of the data frame. A block 560 thereafter provides the data frames over multiple lanes. In some embodiments, the placeholder insertion block may provide an indication of a SOF to the timestamp engine to enable efficient timestamp processing. Since the timestamping engine may be aware of which lane the SOF will be mapped to, the timestamping engine may correct the timestamp to the time of day at which the last symbol for lane 0 is generated. In some embodiments, the placeholder insertion block may also provide an indication of the fill level of the buffers therein and/or when an alignment marker is expected. In doing so, the PHY may leverage the existing buffering capability in the transmit block. For example, the timestamp engine may hold back the timestamped frame an additional time period to allow enough idle symbols to be generated by the MACSec block to compensate for the inserted alignment marker placeholder. Accordingly, the timestamp engine may delay timestamp processing to allow the buffers in the placeholder insertion block to run empty, thus resulting in a constant latency through the MACSec block which otherwise would have variable latency. A block 560 thereafter provides the data frames over multiple lanes.

Figure 6:
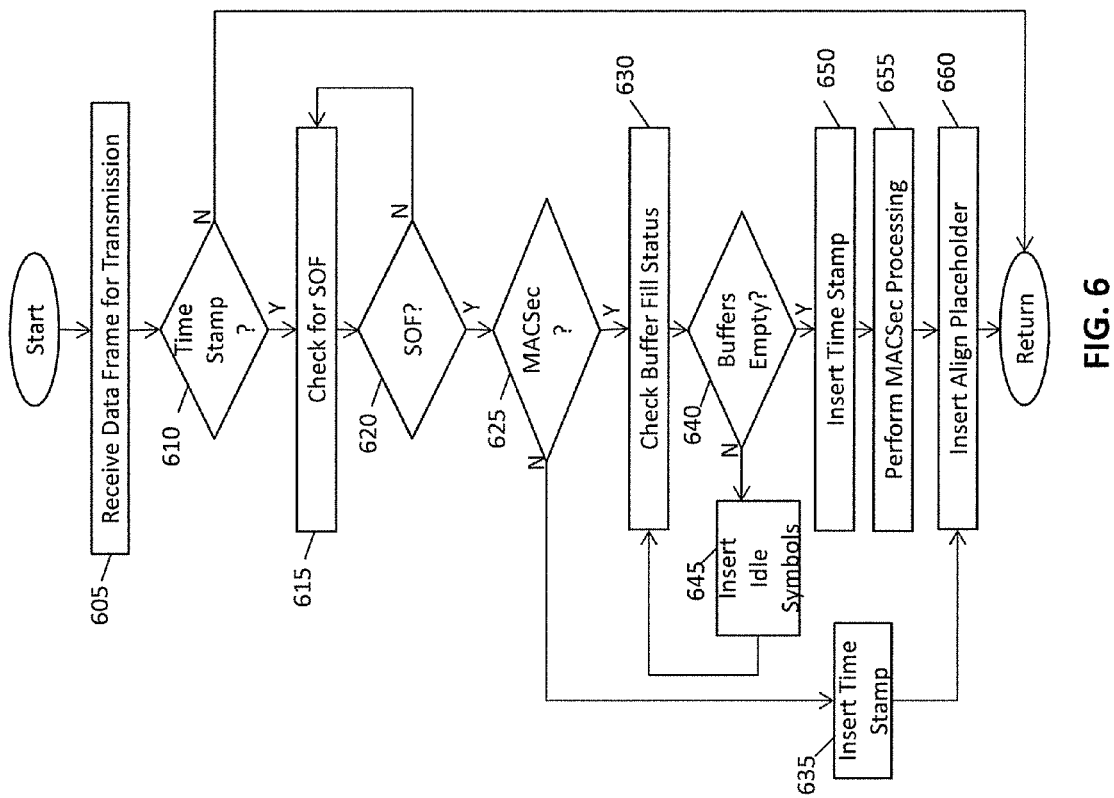
FIG. 6 is a flow diagram illustrating a process for providing high accuracy timing information in a communication device in accordance with aspects of the present invention.

FIG. 6 is a flow diagram illustrating a process in accordance with aspects of the present invention. Referring to FIG. 6, at block 605, the process receives a data signal for transmission. At block 610, the process determines whether a timestamp is needed for the received data frame. At block 615 the process performs a check for a SOF. This may be done by determining for example whether a SOF delimiter has been received. At block 620, the process determines whether the SOF delimiter has been received. If the SOF delimiter has not been received, the process returns to block 615 and continues to check the data stream for a SOF delimiter.

On the other hand, if the SOF delimiter has been detected, at block 625, the process determines whether the data frame will be subject to MACSec processing. If the data frame will not be subjected to MACSec processing, at block 635, the process inserts a timestamp at a designated location within the data frame. If the data frame will be subjected to MACSec processing, at block 630, the process checks buffer fill status. In some embodiments, the process checks the buffer fill status of buffers utilized for MACSec processing. In some embodiments, the process may also check the fill level of buffers included in blocks subsequent to the MACSec processing block.

At block 640, the process determines if the MACSec buffers are empty. If the buffers are not empty, at block 645, the process inserts idle symbols. As a result, the timestamp engine delays timestamp processing for the received data frame. The process then returns to block 630 to check to buffer fill state. When the MACSec block buffers are empty, at block 650, the process performs timestamp processing to calculate a timestamp and inserts the timestamp into the data frame. At block 655, the process performs MACSec processing on the timestamped data frame. At block 660, the process inserts a placeholder for an alignment marker. The placeholder alignment marker may be inserted at a predetermined location within the data frame. The modified frame including the placeholder alignment marker may further be supplied to PCS configured for MLD and transmitted via a transmitter.

By ensuring that the MACSec buffers are empty before performing timestamp and MACSec processing, the process ensures that the MACSec block will have a fixed delay. Accordingly, variable latency due to the buffer structures inside the MACSec and MAC blocks may be eliminated, thereby improving the accuracy of timestamping within the PHY.

While various embodiments of the present invention have been described above, it should be understood that they have been presented by way of example, and not limitation. It will be apparent to persons skilled in the relevant art that various changes in detail can be made therein without departing from the spirit and scope of the invention. Thus, the present invention should not be limited by any of the above-described exemplary embodiments, but should be defined only in accordance with the claims supported by this disclosure and their insubstantial variations.

What is claimed:

1. A physical layer communication device, comprising:
a rate adaptation block to receive and buffer frames to be transmitted;
a timestamp engine, coupled to the rate adaptation block, to timestamp some of the frames by adding to the some of the frames an indication of a predicted time that the frame is transmitted; and
a placeholder insertion block, coupled to the timestamp engine, to insert alignment marker placeholders into the frames, the placeholder insertion block additionally providing to the timestamp engine an indication of a level of fill of buffers in the placeholder insertion block;
wherein the timestamp engine delays timestamping of the some of the frames when the indication of the level of fill of the buffers in the placeholder insertion block indicates that the buffers are not empty.

2. The device of claim 1, further comprising a media access control security (MACSec) block, coupled between the timestamp engine and the placeholder insertion block, the MACSec block including an encryption engine for encrypting the frames.

3. The device of claim 2, wherein the timestamp engine accounts for delays related to the MACSec block in timestamping the some of the frames.

4. The device of claim 1, wherein the placeholder insertion block is configured to insert the alignment marker placeholder once for every 16,000 blocks, wherein the alignment marker placeholder is 64 bits.

5. The device of claim 4, wherein each of the blocks comprises 66 bits.

6. A method of performing timestamp related processing for frames subject to media access control security (MACSec) processing, comprising:
- inserting idle symbols until buffers utilized for MACSec processing are empty;
- inserting a timestamp into a data frame once the buffers utilized for MACSec processing are empty;
- performing MACSec processing on the timestamped data frame; and
- inserting a placeholder for an alignment marker at a predetermined location within the MACSec processed data frame.

7. The method of claim 6, wherein the placeholder is inserted at a fixed rate.

8. The method of claim 6, wherein the alignment marker comprises a lane marker for a multilane distribution environment.

9. The method of claim 6, wherein the timestamp is a correction value.

* * * * *